Dec. 29, 1970   J. GUILLERD ET AL   3,551,321

TUBULAR OZONIZER

Filed May 22, 1968   2 Sheets-Sheet 1

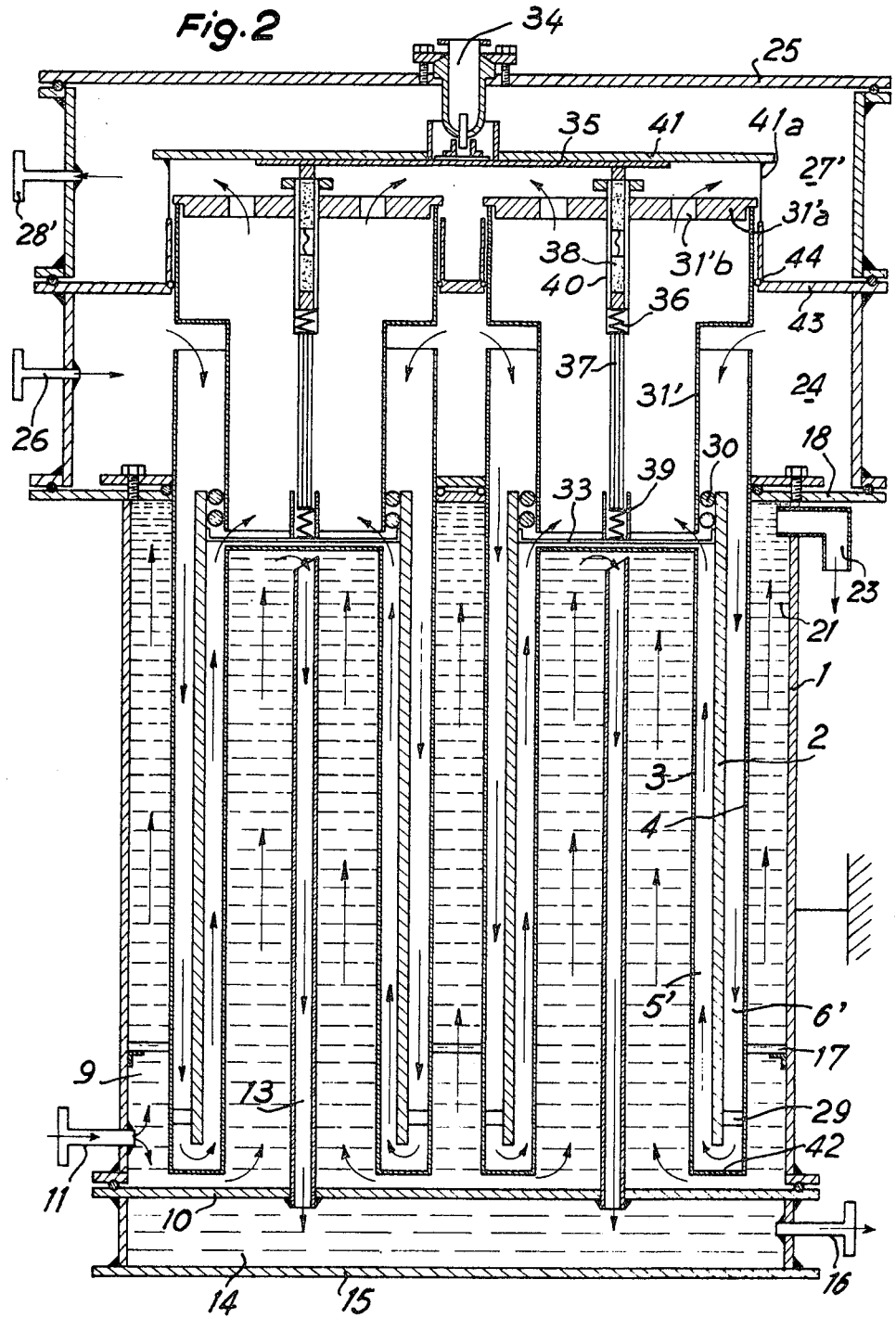

3,551,321
TUBULAR OZONIZER
Jean Guillerd, Paris, and Fernand Travers, Chennevieres, Marne, France, assignors to Compagnie des Eaux et de l'Ozone, Paris, France
Filed May 22, 1968, Ser. No. 731,220
Claims priority, application France, May 22, 1967, 107,185
Int. Cl. C01b 13/12
U.S. Cl. 204—321                                    3 Claims

ABSTRACT OF THE DISCLOSURE

A tubular ozonizer is provided with a high voltage electrode coaxially interposed between two tubular dielectrics to produce two discharge fields, one on each side of the high voltage electrode. A gas to be ionized is passed through the fields, either in parallel or in succession and the ozonized gas is collected at an outlet. The dielectrics are cooled by the circulation therepast of a thermally and electrically conducting fluid connected to ground.

---

Figure 1:
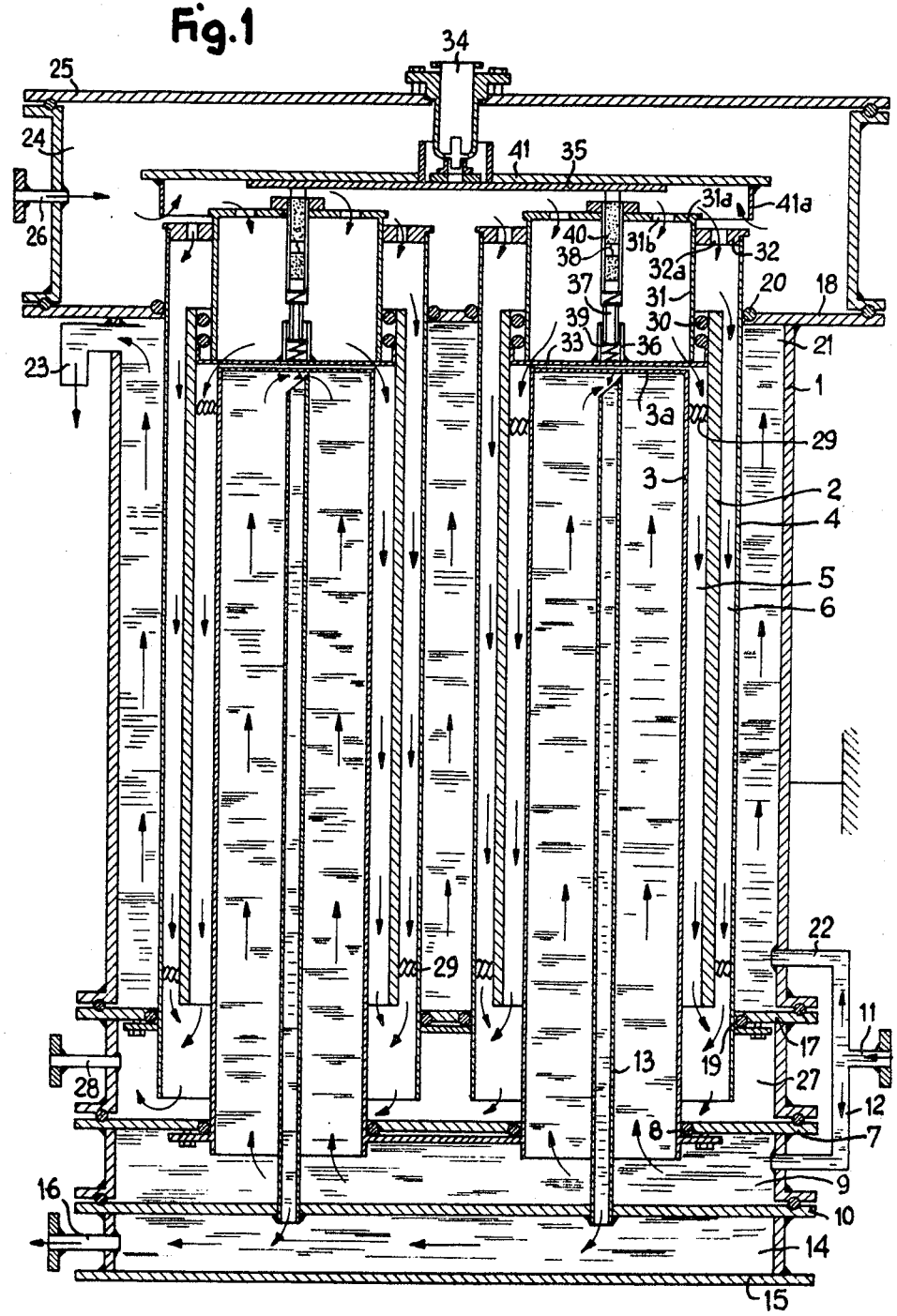

The present invention concerns ozonizers of the tubular electric type.

The known ozonizers of this type comprise in respect of each discharge element, two coaxial hollow cylindrical electrodes one constituting the ground, the other connected to high voltage, between which is disposed coaxially with respect to the said electrodes at least one hollow cylinder of dielectric material, the electrodes and the dielectric being cooled by the circulation of water.

Distinction is thus made over:

(a) Ozonizers constituted by a first glass tube containing water and held at a high potential and a second glass tube outside the first surrounded by water connected to ground.

The discharge is established between the two tubes forming the dielectrics.

Here the water plays a double role, i.e. electric on the one hand, and for cooling the dielectrics on the other.

(b) Ozonizers comprising an outer metallic electrode immersed in water connected to ground, and a dielectric tube of smaller diameter the inner surface of which is metallized and is sheathed internally by a metallic tube connected to high voltage; the discharge in this case being between the grounded electrode and the dielectric;

(c) Ozonizers comprising a high voltage electrode constituted by a metallic tube and a dielectric tube of greater diameter, cooled externally by water connected to ground. The discharge is produced between the high voltage electrode and the dielectric tube.

The ozonizers of the type (a) are not used in practice on an industrial scale because of their complexity and the fragility of their discharge element.

With regard to types (b) and (c) they do not produce the same performances.

Thus it is known that the heating of the dielectrics involves a consumption of non-ozone-generating energy and this the more so as their temperature is raised. Thus it follows that the energy yields of the type (c) ozonizers are superior to those of the type (b) ozonizers, their dielectric being better cooled by direct contact with water than the ozonizers of type (b) which is only very partially cooled (by conduction through the hot discharge, from the cooled grounded electrode).

Furthermore, the efficiency of the cooling of the dielectrics counteracting their deterioration or their breakage, enables the power per unit area of the discharge to be considerably increased and, consequently, the production of ozone.

Nevertheless, there is a limit to this power density for known tubular ozonizers, and in consequence a limit to the production of a discharge element of given dimensions.

The object of the invention is to practically double the discharge area of such a discharge element and as a consequence to increase correspondingly the maximum admissible power and the production of ozone.

To this end the subject of the invention is novel tubular ozonizers comprising at least one discharge element which is composed essentially of a tubular high voltage electrode connected to a high voltage input terminal and interposed coaxially between two tubular dielectrics cooled by the circulation of water or some other thermally and electrically conducting fluid connected to ground, in such a manner as to create two discharge fields on one side and the other of the high voltage electrode.

According to a first embodiment of the tubular ozonizers according to the invention, the discharge fields are disposed in parallel and air or other gaseous fluid containing the oxygen to be ozonized (which will be referred to hereafter simply as fluid to be ozonized) is sent simultaneously into the two discharge fields and the ozonized fluid is collected at the output from these discharge fields.

According to a second embodiment of the tubular ozonizers according to the invention the discharge fields are disposed in series and the fluid to be ozonized passes successively through the discharge fields and the ozonized fluid is collected at the output of the second discharge field.

All the known tubular discharge elements only provide a single discharge per element if they are of type (a), (b) or (c).

Each discharge element according to the invention provides two discharges.

Of course, the double discharge element according to the invention can always operate as a single discharge. For this it is sufficient not to use water or some other conductive fluid for one of the dielectrics, which at the same time does away with the corresponding ground electrode.

Besides doubling the discharge area and increasing the production capacity, the invention provides a second advantage. At the level of energy yield, one knows in effect that the latter is better when the discharge operates at a reduced power density. But, to be precise in the double discharge element a given operational power is distributed over double the area of that of a single discharge element, or in other words, the apparatus operates at half the power density and its yield is improved.

Finally, as a third advantage of the invention, since the power absorbed is a function of the value of the high voltage applied to the electrodes, the double discharge element only requires, for a given power, a value of high voltage which corresponds to half the power for a single discharge elements, a factor which is eminently favorable as regards risks of distortion and electrical arcing (having regard to the characteristics of the leakage paths provided in the ozonizer). The latter provides an increased safety in use in the case, for example, of the slightest accidental dryness of the fluid to be ozonized.

In what follows will be described various embodiments of the novel tubular ozonizer according to the invention with reference to the accompanying drawing in which:

FIG. 1 is a sectional view in elevation of an ozonizer according to the invention having two discharges in parallel per discharge element;

FIG. 2 s a sectional view in elevation of an ozonizer according to the invention having two discharges in series per discharge element.

Referring particularly to FIG. 1 of the drawing, the tubular ozonizer according to the invention comprises a metal vessel 1 connected to ground, within which are disclosed discharge elements (two of which are represented in the drawing) having two discharges in parallel per discharge element.

Each of these discharge elements is composed essentially of a tubular high voltage electrode 2 connected to a high voltage input terminal and interposed coaxially between two tubular dielectrics 3, 4 cooled by circulation of water connected to ground, in such a manner as to create two discharge fields 5, 6 on one side and the other of the high voltage electrode.

The inner dielectric 3 consists of a tube of glass or other insulating material resistant to high voltage and to ozone, of small thickness, closed by a head 3a at its upper end; the tube 3 passes through a separation plate 7 to which it is fixed vertically with the interposition of a fluid-tight joint 8 in an ozone resistant resilient material; this tube issues into a cooling water inlet chamber 9 bounded by the lateral wall of the vessel 1, the said separation plate 7 and a second separation plate 10, the water being brought into chamber 9 by the pipe 11, via the conduit 12. A water evacuation tube 13 forming an overflow is fixed vertically to the second separation plate 10 and is extended into the interior of the inner dielectric 3 in the neighborhood of the head 3a; the tube 13 issues into a cooling water evacuation chamber 14 bounded by the lateral wall of the vessel 1, the separation plate 10 and the base 15 of the vessel; the cooling water for the inner dielectric is introduced into the chamber 9 and rises in the inside of the inner dielectric 3, the water being evacuated by the tube 13 into the chamber 14 where the water is discharged by the pipe 16. Thus when filling, the tube 13 serves to evacuate the air and consequently to ensure the circulation of the cooling water for the inner dielectric.

The outer dielectric 4 is a tube of glass or other insulating material resistant to high voltage and to ozone, of slight thickness, open at its two ends, and fixed vertically to two separation plates 17, 18 through which it passes at the level of the said ends, with the interposition of sealing joints 19, 20 respectively.

The cooling water for the outer dielectric is brought into the lower portion of the said space by the pipe 11 via the conduit 22 and is evacuated from the upper part of the said space by the pipe 23. The cooling water circulates from bottom to top in the annular space 21 bounded by tube 4, the wall of the vessel 1 and the separation plates 17, 18. The height of the space 21 is substantially equal to the length of the high voltage electrode 2 so as to avoid the occurrence of a cushion of air or of oxygen which would be ionized and would be a cause of "flash" and of parasitic discharges.

The upper end of the outer dielectric tube issues into the inlet chamber 24 for fluid to be ozonized and bounded by the wall of the vessel 1, the saparation plate 18 and a cover 25, the fluid to be ozonized being admitted to chamber 24 by the pipe 26. The lower end of the outer dielectric tube opens some distance above the separation plate 7 in an outlet chamber for ozone 27 bounded by the wall of the vessel 1, the inner dielectric tube 3, and the separation plates 7, 17 the ozone which is formed being evacuated by the pipe 28.

The high voltage electrode 2 consists of a metal tube of a small thickness centered between the dielectric tubes 3, 4 by centering screws 29 and force fitted with the interposition of toric joints 30 over a tube of glass or other insulating material 31 which surmounts the said electrode. The tube is closed by a cover 31a and is maintained in position by a suspension and centering ring 32 which closes the upper end of the outer dielectric tube 4. The ring 32 and the cover 31a are also provided with openings 32a and 31b respectively placing the discharge fields 5, 6 into communication with the inlet chamber 24 for air or fluid to be ozonized.

The high voltage electrode 2, at the upper end of which is fixed a metal cross piece 33 along a diameter, is connected to a high voltage input terminal 34 mounted in the center of the cover 25 and connected electrically to a circular plate 35 for the distribution of high voltage current, via a flexible contact system having spring contacts 36, push-button 37, and fuse 38; the said system is accommodated on the one hand in an axial socket 39 carried by the cross piece 33 and on the other hand in a fuse carrier 40 coaxially fixed in the cover 31a. The plate 35 for the distribution of high voltage is also integral with an insulating support plate 41, which is extended downwards by a skirt 41a that covers all of the discharge elements and conducts the fluid to be ozonized coming from the chamber 24 into the discharge elements.

In operation, two discharges are produced one on each side of the high voltage electrode 2 by the discharge element; the fluid to be ozonized arriving at the chamber 24 passes on the one hand through the flow opening 32a in the suspension and centering ring 32 then circulates from top to bottom in the discharge field 6 and on the other hand through the flow opening 31b of the cover 31a then the discharge field 5 also from the top to bottom, and the ozonized fluid is collected at the outlet from the discharge fields in the chamber 27 and is evacuated by means of the pipe 28.

The concept behand the apparatus and the choice of dimensional characteristics of the discharge element is to allow operation under pressure without altering the production and the energy yield with respect to preceding at atmospheric pressure.

A marked advantage results in the simplification and economy of use of the ozonized fluid produced. In effect one can even use the process by compression-diffusion through porous elements which is less objectionable from the point of view of installation and use.

In accordance with the variant represented in FIG. 2 of the drawing, the tubular ozonizer in accordance with the invention comprises a certain number of discharge elements (two of which are shown in the drawing) having two discharges in series per discharge element.

To this end, the outer dielectric tube 4 is closed at its lower end by an annual base 42 which joins it to the lower end of the inner dielectric tube 3. Because of this the discharge field 5' follows the discharge field 6'.

Furthermore, the base 42 replaces the separation plate 7 which serves for mounting the inner dielectric in the embodiment shown in FIG. 1.

The insulating tube 31' on which is fitted the high voltage electrode 2, is no longer maintained in position by a suspension and centering ring as is the case in FIG. 1, but passes through a separation plate 43 to which it is fixed with the interposition of a sealing joint 44.

This separation plate 43 defines, on the one hand inlet chamber 24 for fluid to be ozonized with the separation plate 18 and the wall of the vessel 1, and on the other hand collecting chamber 27 for ozonized fluid, with the cover 25 and the wall of the vessel 1, the ozonized fluid being evacuated from the chamber 27 by the pipe 28'.

Thus the fluid to be ozonized arriving in the chamber 24 penetrates into the outer dielectric tube 4, passes from top to bottom through the first discharge field 6', then rises again through the second discharge field 5' while being ozonized; the ozonized fluid passes through the crosspiece 33, the interior of the insulating tube 31' the outlet opening 31b of the cover 31a and is collected in the ozone chamber 27' from where it is evacuated in the pipe 28'.

Of course, the system of circulation of the fluid to be ozonized may be inverted, nevertheless, the strongly ionized condition of the ozonized fluid renders it conductive and facilitates electric conduction. The leakage paths are necessarily much longer in the recommended sense which enables the high voltage to be greatly increased and as a consequence the power dissipated and the production of ozone.

What is claimed is:

1. A tubular ozonizer comprising two spaced tubular dielectrics, at least one discharge element which comprises a tubular high voltage electrode connected to a high voltage input terminal, said high voltage electrode being interposed coaxially between said two tubular dielectrics to produce two discharge fields, one on each side of the high voltage electrode, means for cooling said dielectrics by the circulation therepast of a thermally and electrically conducting fluid connected to ground, and means for passing a gas to be ozonized through said fields.

2. An ozonizer according to claim 1, wherein the discharge fields are disposed in parallel and said means which passes the gas to be ionized is constructed to pass said gas simultaneously into the two discharge fields, the ozonized gas being collected at an outlet from said discharge fields.

3. An ozonizer according to claim 1, wherein the discharge fields are disposed in series and said means which passes the gas to be ionized is constructed to pass said gas successively through the two discharge fields, the ozonized gas being collected at an outlet from said second discharge field.

References Cited

UNITED STATES PATENTS

| | | | |
|---|---|---|---|
| 2,529,137 | 11/1950 | Chadwick | 204—321X |
| 2,607,726 | 8/1952 | Chadwick | 204—321 |
| 3,364,129 | 1/1968 | Cremer et al. | 204—321 |

HOWARD S. WILLIAMS, Primary Examiner

N. ALAN KAPLAN, Assistant Examiner

U.S. Cl. X.R.

204—176